(12) United States Patent
Boyce et al.

(10) Patent No.: US 9,745,719 B1
(45) Date of Patent: Aug. 29, 2017

(54) MECHANICAL CONTROL ARRANGEMENT FOR WORK VEHICLE

(71) Applicant: Deere & Company, Moline, IL (US)

(72) Inventors: Dean A. Boyce, Waterloo, IA (US); Amanda N. Owen, Cedar Falls, IA (US)

(73) Assignee: Deere & Company, Moline, AZ (US)

( * ) Notice: Subject to any disclaimer, the term of this patent is extended or adjusted under 35 U.S.C. 154(b) by 0 days.

(21) Appl. No.: 15/056,654

(22) Filed: Feb. 29, 2016

(51) Int. Cl.
*B60N 2/00* (2006.01)
*E02F 9/20* (2006.01)
*E02F 9/16* (2006.01)
*F16C 1/10* (2006.01)
*E02F 3/34* (2006.01)

(52) U.S. Cl.
CPC .............. *E02F 9/2004* (2013.01); *E02F 9/16* (2013.01); *F16C 1/10* (2013.01); *E02F 3/34* (2013.01)

(58) Field of Classification Search
CPC ... E02F 9/2004; E02F 9/16; E02F 3/34; F16C 1/10
See application file for complete search history.

(56) References Cited

U.S. PATENT DOCUMENTS

| 5,065,967 | A  | * | 11/1991 | Murakami | ............... E02F 9/166 248/161 |
|---|---|---|---|---|---|
| 8,770,612 | B2 |   | 7/2014 | Wendte et al. | |
| 2005/0279540 | A1 | * | 12/2005 | Wisner | ...................... A61G 5/10 180/65.1 |
| 2010/0187859 | A1 | * | 7/2010 | Hill | ....................... B60N 2/4646 296/190.01 |

OTHER PUBLICATIONS

John Deere, 4 Series Sprayers R4023 Product Brochure, Admitted Prior Art.
U.S. Appl. No. 14/520,820 Entitled Coupling Mechanism, filed with the United States Patent and Trademark Office on Oct. 22, 2014.

* cited by examiner

*Primary Examiner* — Lori L Lyjak
(74) *Attorney, Agent, or Firm* — Lorenz & Kopf, LLP (57) ABSTRACT

A work vehicle has an operator cabin and an adjustable seat, which is supported by a seat mount surface located within the operator cabin. An elongated opening opens to the interior of the cabin. A mechanical control system may include an operator input device, such as a joystick device, which is mounted to the adjustable seat and which moves therewith as the adjustable seat is slid along a first axis. The mechanical control system includes a port, which is located beneath the seat mount surface and spaced from the elongated opening. A mechanical linkage, such as a push-pull cable, extends from the operator input device, through the elongated opening and the port, and to the exterior of the operator cabin.

20 Claims, 6 Drawing Sheets

MECHANICAL CONTROL ARRANGEMENT FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to work vehicles and, more particularly, to provisions for mechanical control systems within the operator environments of work vehicles.

BACKGROUND OF THE DISCLOSURE

Work vehicles are often equipped with operator input devices, which are utilized to control various operational aspects of the work vehicle. For example, movement of a work vehicle implement may be controlled utilizing a joystick device located within the operator cabin of the work vehicle on which the implement is installed. In one common control architecture, rotation of the joystick may modulate one or more control valves. The control valves may, in turn, regulate the flow of pressurized hydraulic fluid to hydraulic cylinders, which then extend or retract to effectuate the desired implement movements. The operator input device (e.g., joystick device) may be included in a larger control system, which further includes one or more components (e.g., the control valves) actuated or modulated by movement of the operator input device. In certain instances, the operator input device may be mechanically linked to the actuated component or components by one or more linkages (e.g., push-pull cables) in a manner physically conveying movement of the input device to the actuated components. In such embodiments, the operator input device may be referred to as a "mechanical" input device, while the larger system containing the input device may be referred to as a "mechanical control system."

SUMMARY OF THE DISCLOSURE

Embodiments of a work vehicle including a mechanical control system are disclosed.

In one embodiment, the work vehicle includes an operator cabin and an adjustable seat, which is supported by a seat mount surface located within the cabin. An elongated opening opens to the interior of the cabin and, in certain cases, may be provided in the seat mount surface at a location laterally adjacent the adjustable seat. The mechanical control system may include an operator input device, such as a joystick device, which is mounted to the adjustable seat and which moves therewith as the adjustable seat is slid along a first axis. The mechanical a port, which is located beneath the seat mount surface and spaced from the elongated opening. A mechanical linkage, such as a push-pull cable, extends from the operator input device, through the elongated opening and the port, and to the exterior of the operator cabin.

In another embodiment, the work vehicle includes an operator cabin, an actuated component located substantially beneath the operator cabin, and an operator input device movably mounted within the operator cabin. A push-pull cable mechanically links the operator input device to the actuated component such that movement of the operator input device actuates the actuated component. The work vehicle further includes a cable routing box, which defines a lower compartment located substantially beneath the seat mount surface. The push-pull cable extends from the operator input device, through the lower compartment, and to the actuated component.

Mechanical control systems including operator input devices are further provided. The mechanical control system is configured to be installed on a work vehicle including an adjustable seat and a cabin having an exterior. The adjustable seat is supported by a seat mount surface of the operator cabin and is movable relative thereto. In one embodiment, the mechanical control system includes an operator input device, which is configured to be mounted to the adjustable seat and to move therewith when the mechanical control system is installed within the work vehicle. The mechanical control system also includes a cable routing box, which is configured to be mounted to the seat mount surface of the operator cabin. When mounted in this manner, the cable routing box defines a lower compartment located substantially beneath the seat mount surface. A mechanical linkage extends from the operator input device, through the lower compartment, and to the exterior of the operator cabin when the mechanical control system is installed within the work vehicle.

The details of one or more embodiments are set forth in the accompanying drawings and the description below. Other features and advantages will become apparent from the description, the drawings, and the claims.

BRIEF DESCRIPTION OF THE DRAWINGS

At least one example of the disclosure will hereinafter be described in conjunction with the following figures, wherein like numerals denote like elements, and.

DETAILED DESCRIPTION

The following describes one or more example embodiments of the disclosed mechanical control arrangement for a work vehicle, as shown in the accompanying figures of the drawings described briefly above. Various modifications to the example embodiment(s) may be contemplated by one of skill in the art.

Mechanical control systems provide certain advantages over types of control systems, which lack mechanical linkages between the operator input devices and the components directly actuated by the input devices. Relative to electromechanical control systems, for example, mechanical control system tend to container fewer (if any) electronic components, such as solenoids, controllers, electrical wiring, and the like. Mechanical control systems consequently tend to be relatively structurally robust, less complex, and less costly than their electromechanical counterparts. Such advantages notwithstanding, mechanical control systems remain limited in certain respects. For example, the provision of the mechanical linkage or linkages between the operator input device and the actuated component or components can place undesired constraints on the positioning of the operator input device within the operator environment of the work vehicle.

It is thus may be desirable to provide embodiments of a mechanical control system including at least one operator input device, such as joystick device, which overcomes one or more of the above-described limitations. For example, it would be desirable provide embodiments of a mechanical control system enabling such an operator input device to be positioned and repositioned, as desired, within the operator environment of a work vehicle in a manner enhancing control system convenience and ergonomics. It would also be desirable to provide embodiments of a work vehicle including such a mechanical control system.

The following describes embodiments of a mechanical control system including at least one operator input device, which is well-suited for deployment onboard a tractor or other work vehicle. As will be described in detail below, the mechanical control system enables the operator input device to be positioned and repositioned over a relatively broad Range of Motion (ROM) within the operator environment of the work vehicle without affecting the functionality of the input device. The ability to position and reposition the operator input device greatly enhances flexibility in designing and manufacturing the mechanical control system. Additionally, the ability to position and reposition the operator input device in this manner enables the input device to be mounted to a non-fixed structure within the work vehicle, such as an adjustable seat located within the operator cabin of the work vehicle. The relative mobility of the operator input device may also help accommodate any other relative movement between the operator input device and the actuated device or devices as may occur due to, for example, the integration of a suspension system into the operator cabin or adjustable seat. The mechanical control system may thus provide a more ergonomic and less cumbersome experience as an operator of the work vehicle interacts with the operator input device.

In one embodiment, and by way of example only, the mechanical control system includes an operator input device (e.g., a joystick device) mounted to an adjustable seat, which is located within the operator cabin of a work vehicle. The operator input device is mechanically linked to at least one actuated component (e.g., a valve) by one or more mechanical linkages (e.g., push-pull cables). The adjustable seat is supported by a seat mount surface and is movable along at least a first axis, such as a fore-aft axis extending parallel to the longitudinal axis of the work vehicle. An opening is provided in the seat mount surface and may be elongated along the first axis. A port is provided beneath the seat mount surface and vertically spaced from the elongated opening. The mechanical linkage or linkages extend from the operator input device, through the elongated opening and the port, and to the exterior of the operator cabin. In certain embodiments, the port may be provided through a lower portion of a linkage or cable routing box, which is mounted beneath the opening at least in substantial part. In embodiments wherein the mechanical linkage or linkages include at least one push-pull cable, the cable routing box may create an additional volume of space to allow the provision of sufficient free length or "slack" within the push-pull cable to accommodate movement of the adjustable seat.

Example embodiments of a mechanical control system including at least one operator input device are described below in conjunction with FIGS. 2-7D. In the below-described embodiments, the mechanical control system contains a joystick device, which is mounted to and moves in conjunction with an adjustable seat located within the operator cabin of a work vehicle. In further embodiments, the mechanical control system may include a different type of operator input device in addition to or in lieu of a joystick device. Additionally, the operator input device need not be mounted to an adjustable seat in all embodiments and may instead be mounted to another non-fixed structure within the operator environment, such as a movable tray or arm mounted to the dash of the work vehicle. To provide an illustrative context in which embodiments of the mechanical control system may be better understood, the following describes the example mechanical control system primarily in conjunction with a tractor including an example Front End Loader (FEL) shown in FIG. 1. This notwithstanding, it is emphasized that embodiments of the mechanical control system can be deployed onboard other types of work vehicles in further embodiments and that the control system can be utilized to control other operational aspects of the work vehicle.

Figure 1:
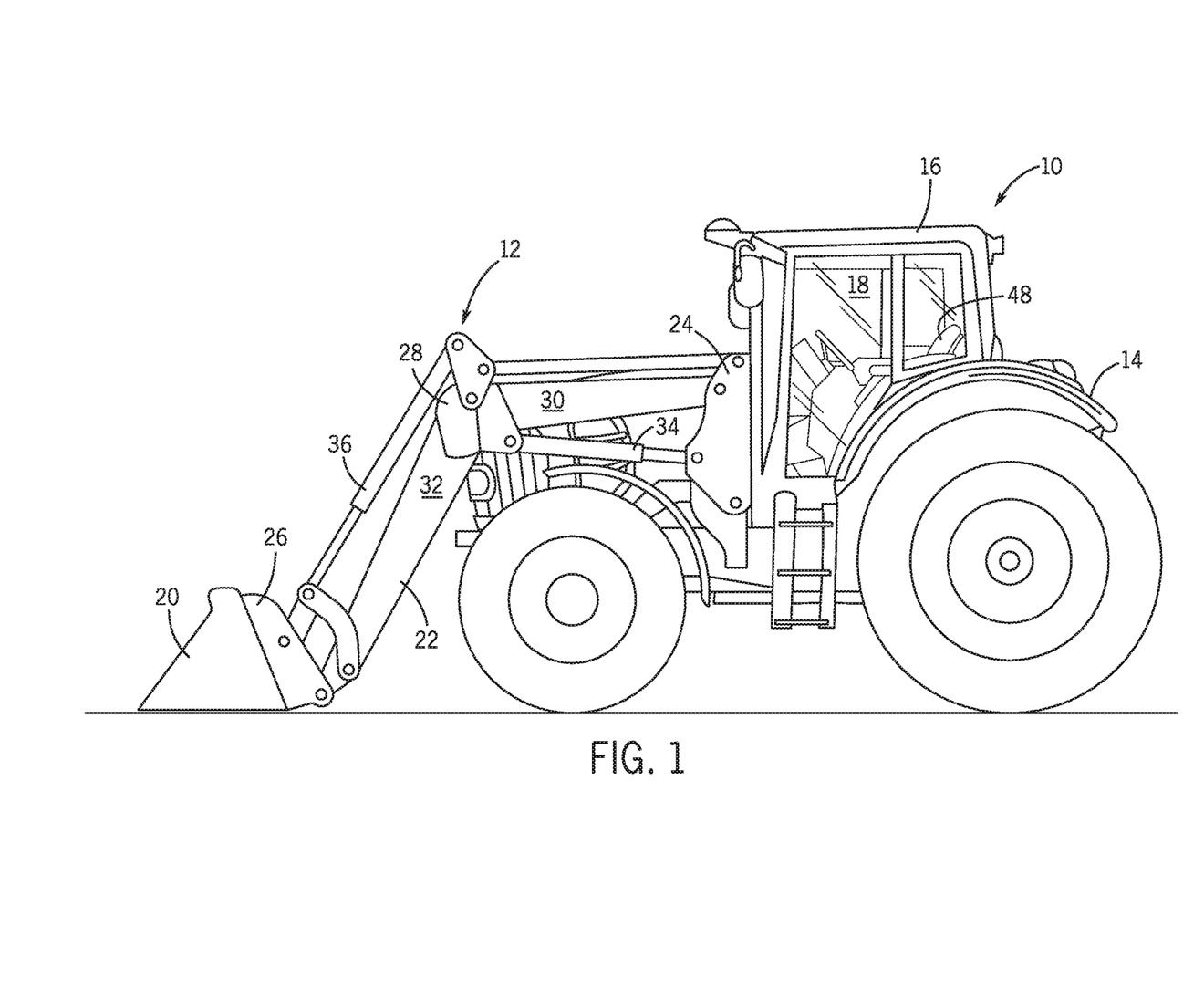
FIG. 1 is a side view of a work vehicle having an operator cabin, an adjustable seat within the operator cabin, and a mechanical control system including an operator input device mounted to the adjustable seat, as illustrated in accordance with an example embodiment of the present disclosure.
Figure 2:
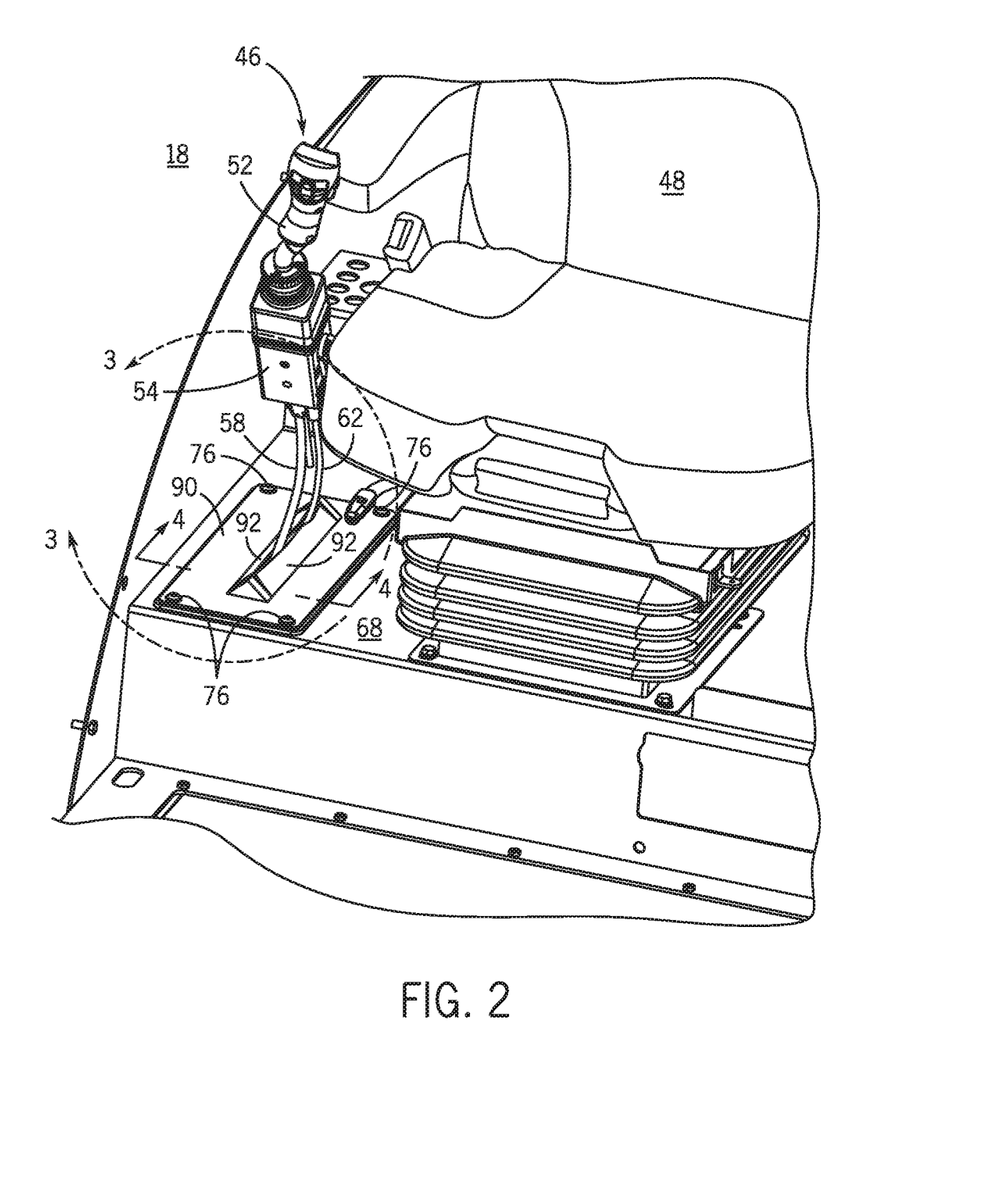
FIGS. 2 and 3 are partial isometric views illustrating the joystick device and push-pull linkages included in the mechanical control system deployed onboard the work vehicle of FIG. 1, as further illustrated in accordance with an example embodiment of the present disclosure.

FIG. 1 is a side view of a tractor 10 equipped with a FEL 12, as illustrated in accordance with an example embodiment of the disclosure. In addition to FEL 12, the tractor 10 includes a wheeled vehicle body 14, an operator cabin 16, and a cabin interior 18 enclosed by the cabin 16. A non-illustrated Heat, Air Conditioning, and Ventilation (HVAV) system may regulate the temperature and airflow within the operator cabin 16. Thus, to improve the effectiveness of the HVAC system and to prevent contamination of the cabin interior 18, the operator cabin 16 may be environmentally sealed. As appearing herein, the term "environmentally sealed" denotes that at least one (and typically multiple) gaskets and other such sealing elements have been incorporated into the structure of the operator cabin 16 to deter the undesired outflow of air from the operator cabin 16 and to further deter inflow of air-entrained debris into the cabin interior 18.

The FEL 12 includes a work implement 20 and a boom assembly 22, which movably mounts the implement 20 to a forward portion of the vehicle body 14. In the illustrated example, the work implement 20 assumes the form of a bucket and will consequently be referred to as hereafter "bucket 20." The bucket 20 can be replaced by a different type of work implement, such as a forklift implement or a bale spear, in alternative embodiments of the tractor 10. The boom assembly 22 can assume any form capable of moving the work implement 20 relative the vehicle body 14 in response to operator commands. In the example embodiment shown in FIG. 1, the boom assembly 22 includes a system of linkages, hydraulic cylinders, plumbing lines (not shown), and other components suitable for this purpose. More specifically, the boom assembly 22 includes an aft bracket 24 affixed to the vehicle body 14, a forward bracket 26 to which the bucket 20 is pivotally attached, and an intermediate or mid bracket 28 between the brackets 24 and 26. Twin lift arms 30 (only one of which can be seen in FIG. 1) pivotally attach the aft bracket 24 to the mid bracket 28, which is, in turn, attached to the forward bracket 26 by twin bucket arms 32 (again only one of which can be seen). Lift cylinders 34 are further coupled between the aft bracket 24 and the mid bracket 28, while bucket cylinders 36 are coupled between the mid bracket 28 and the forward bracket 26.

The FEL 12 further includes other features, such as hydraulic lines, which are not shown in FIG. 1 to avoid unnecessary cluttering the drawing. When the FEL 12 is mounted to the vehicle body 14, the hydraulic lines of the FEL 12 are fluidly connected to a pressurized hydraulic fluid supply on the tractor 10 in a manner permitting an operator seated within the operator cabin 16 to control the cylinders 34 and 36. An operator can command the boom assembly 22 to lift the bucket 20 by controlling the lift cylinders 34 to extend. As the lift cylinders 34 extend, the bucket 20 is lifted from the ground position shown in FIG. 1, travels through an intermediate or mast level position, and is raised to a full height position. Similarly, as the bucket cylinders 36 retract in response to operator commands, the boom assembly 22 tilts the bucket 20 from the forward-facing scoop position shown in FIG. 1, through an intermediate position, and to the upright position. Conversely, from the full height position, the operator can control the boom assembly 22 to stroke the cylinders 34, 36 in a manner opposite to that just described to return the bucket 20 to the grounded, scoop position shown in FIG. 1.

A mechanical control system including at least one operator input device is integrated into the tractor 10 and utilized to control the movements of the FEL 12, as described above. The mechanical control system can include any number and type of operator input devices suitable for controlling FEL movement in this manner. An example mechanical control system 44 (identified in FIGS. 2-7D) including a joystick device 46 (identified in FIGS. 2, 3, 5, and 7A-7D) will now be described. The foregoing description is provided by way of non-limiting example only and with the understanding that the type of work vehicle, the type and number of operator input devices, the type and number of components actuated by the operator input device, and the mounting location of the operator input device can all vary in alternative embodiments of the mechanical control system.

FIGS. 2-6 provide various views of a mechanical control system 44 containing a seat-mounted joystick device 46, as illustrated in accordance with an example embodiment of the disclosure. The joystick device 46 is mounted to an adjustable seat 48, which is located within the operator cabin 16 and which movable along at least one axis. Specifically, in the illustrated example, the adjustable seat 48 is movable in the three Degrees of Freedom (DOFs) as follows. First, the adjustable seat 48 can be slid along a first axis, which extends parallel to the longitudinal axis of the tractor 10 in fore and aft directions. This axis may consequently be referred to herein as the "fore-aft axis" or the "slide axis" and corresponds to the X-axis identified in FIGS. 4-5 by coordinate legend 50. Second, the adjustable seat 48 can be raised or lowered along a vertical axis, which extends perpendicular to the slide axis and which corresponds to the Y-axis of coordinate legend 50. Finally, the adjustable seat 48 can be rotated or swiveled about the vertical axis (again, corresponding to the Y-axis of legend 50) over an angular ROM, which will typically be less than 180 degrees (°). For example, in one implementation, the adjustable seat 48 may have a right hand swivel of approximately 15°. The ROM of the adjustable seat 48 is further illustrated in FIGS. 7A-D, as described more fully below.

The seat-mounted joystick device 46 includes a joystick handle 52 and a stationary base portion 54; the term "stationary" denoting that the base portion 54 is stationary or substantially fixed with respect to the point at which the base portion 54 is mounted to the adjustable seat 48. In this regard, the base portion 54 of the joystick device 46 is mounted to lower forward portion of the adjustable seat 48, and the joystick handle 52 projects therefrom in upward and forward directions. By virtue of such a mounting, the joystick handle 52 of the joystick device 46 is conveniently located in close proximity to the right hand of an operator when seated within the adjustable seat 48, regardless of the manner in which the seat 48 is moved by the operator. The ergonomics and convenience of utilizing the joystick device 46 are enhanced as a result. Such a mounting arrangement is thus highly desirable, but generally requires that the joystick device 46 is capable of moving over a relatively broad of ROM mirroring that of the adjustable seat 48. Further description of the manner in which the mechanical control system 44 permits the joystick device 46 to be positioned and repositioned over such a relatively broad ROM in conjunction with movement of the adjustable seat 48 is set-forth below. First, however, additional description of the manner in which the mechanical control system 44 operates in the illustrated example is provided.

In the illustrated example shown in FIGS. 2-6, the joystick handle 52 is rotatable with respect to the base portion 54 about first and second perpendicular axes. In further embodiments, the joystick handle 52 can have fewer or a greater number of DOFs and may assume various other forms. Rotation of the joystick handle 52 relative to the base portion 54 about the first axis controls the height of the boom assembly 22 (FIG. 1), while rotation of the joystick handle 52 about the second axis controls the tilt angle of the bucket 20 (FIG. 1). Various electronic components (e.g., one or more electrically-active buttons, switches, knobs, wheels, indicator lights, etc.) can be integrated into the joystick device 46, as desired. In this case, however, the joystick device 46 is still considered "mechanical" in nature (as is any other operator input device) providing that at least one mechanical linkage (e.g., the below-described push-pull cables) physically connect the joystick device 46 to one or more actuated components, such as the below-described Selective Control Valves (SCVs) in a manner transmitting movement of the joystick handle 52 to the actuated component(s).

Figures 5, 6:
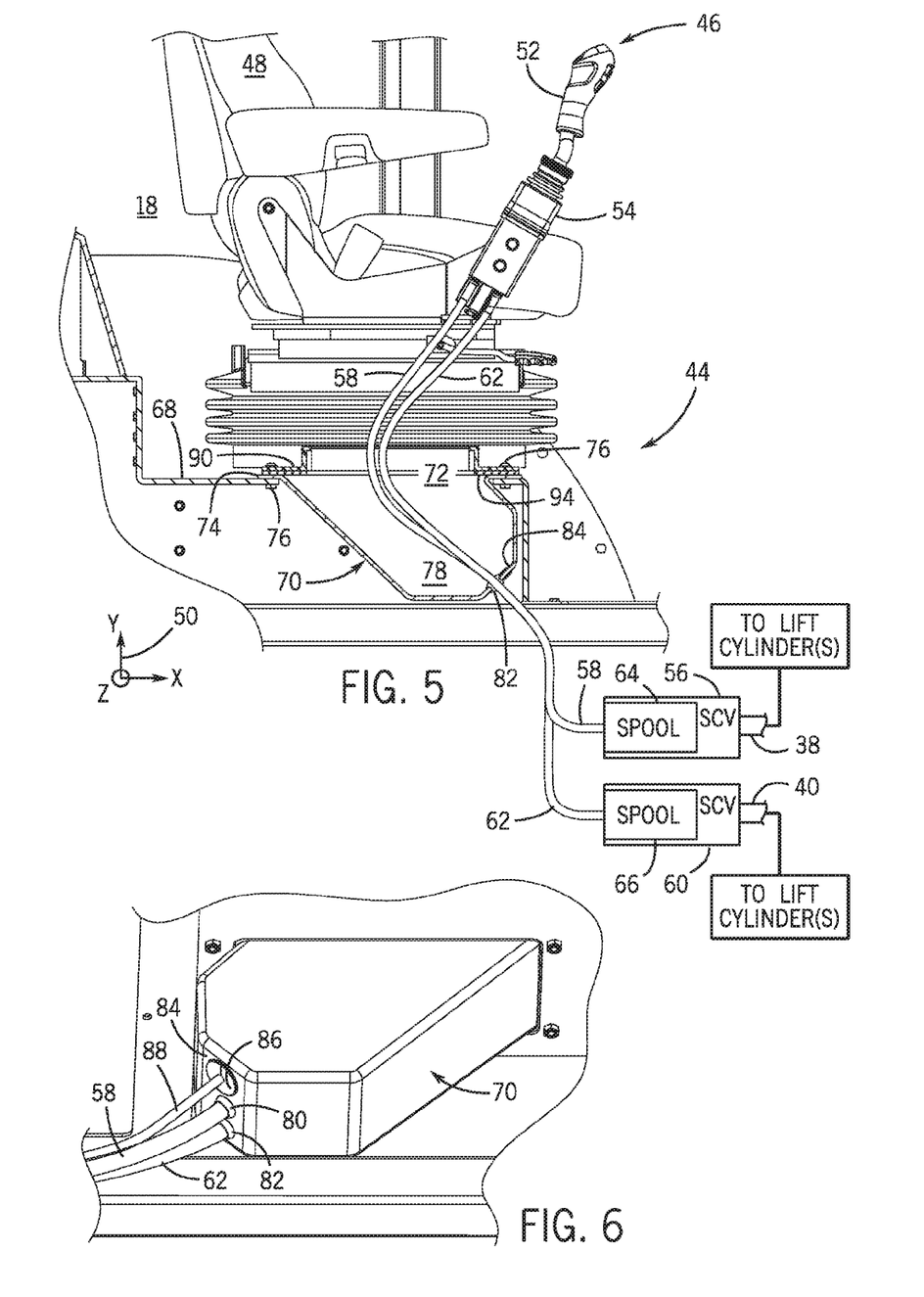
FIG. 5 is a partial cross-sectional side view of the mechanical control system shown in FIGS. 2-4, as taken along a section plane extending through the cable routing box.
FIG. 6 is a partial isometric view of the mechanical control system shown in FIGS. 2-5 more clearly illustrating the underside of the cable routing box and the sealed ports through which the push-pull cables extend.
Figure 7A:
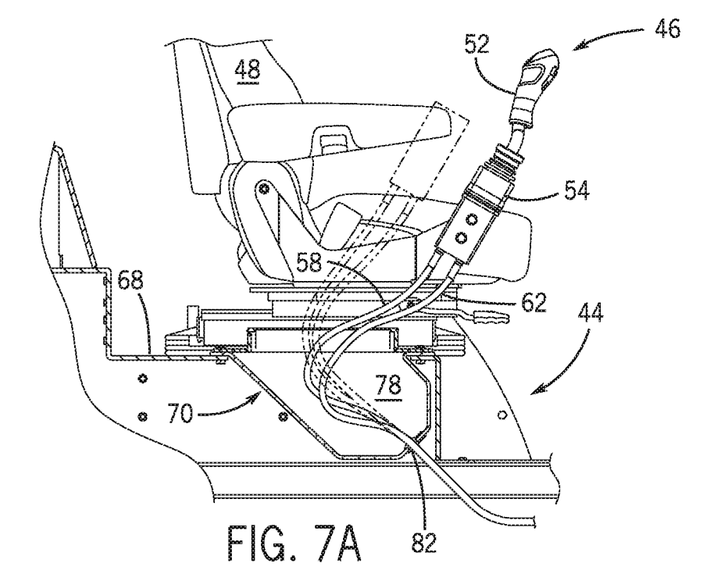
FIGS. 7A-7D are partial side views illustrating the manner in which the joystick device of the mechanical control system shown in FIGS. 2-6 moves in conjunction with movement of the adjustable seat in multiple degrees of freedom.
Figure 7B:
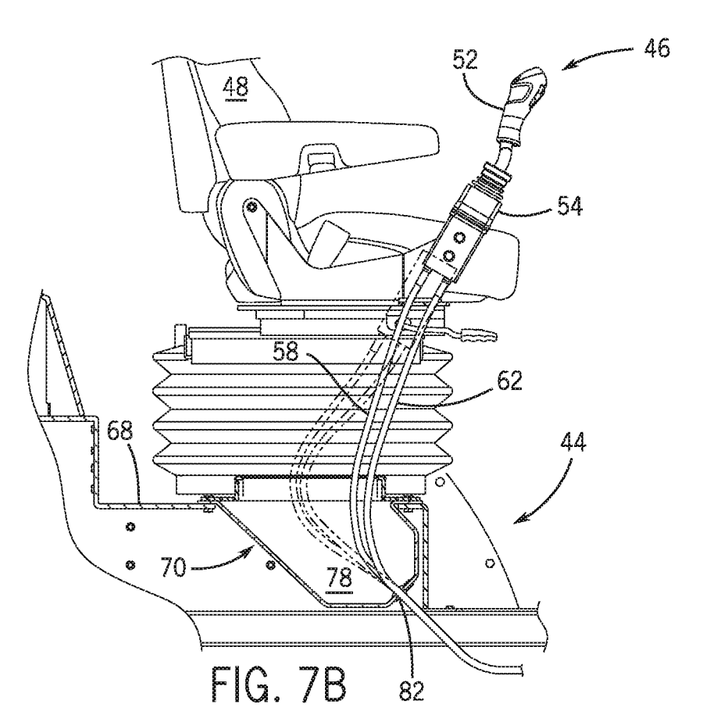
Figure 7C:
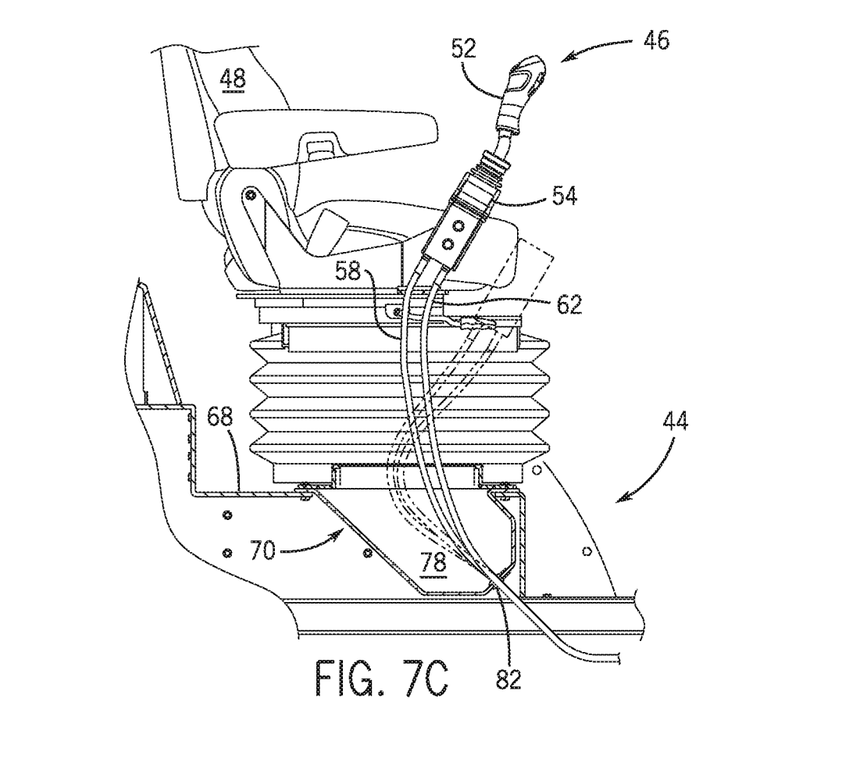
Figure 7D:
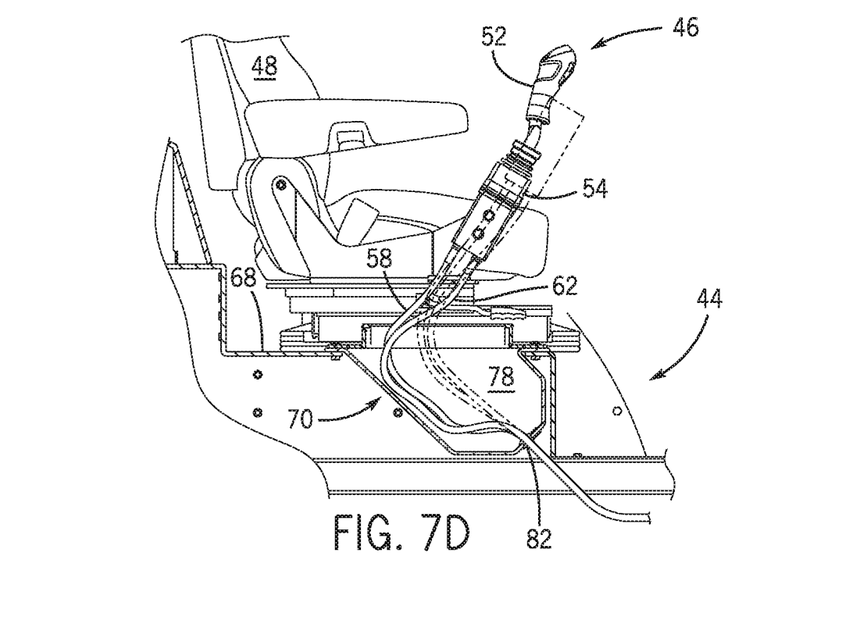

In addition to the seat-mounted joystick device 46, the mechanical control system 44 further includes a first SCV 56, a first push-pull cable 58, a second SCV 60, and a second push-pull cable 62. As schematically illustrated in FIG. 5, the first push-pull cable 58 mechanically links the joystick handle 52 of the joystick device 46 to a valve element or spool 64 contained within the first SCV 56. Similarly, the second push-pull cable 62 mechanically links the joystick handle 52 of the joystick device 46 to a spool 66 contained within the second SCV 60. The push-pull cables 58, 62 each contain a flexible cable or "core," which extends coaxially within and is slidable with respect to an outer sleeve or sheathing. While flexible, the push-pull cables 58, 62 are not infinitely so. Correspondingly, the push-pull cables 58, 62 each have a minimum tolerable bend radius (RMIN). If the push-pull cables 58, 62 are permitted to take a shape or follow a tortuous path containing a tight bend having a radius less than RMIN, undesired binding or interference with the sliding movement of the cores within the push-pull cables 58, 62 can result. Movement of the joystick handle 52 may consequently become difficult, or detriment may otherwise occur to the performance of the mechanical control system 44. Therefore, the mechanical control system 44 is usefully designed such that the push-pull cables 58, 62 are prevented or at least deterred from assuming a shape or following a path including tight bend having a radius less than RMIN. Additional description in this regard is provided below. In one embodiment, and by way of non-limiting example only, RMIN is greater than or equal to about 100 nanometers (RMIN>~100 nm).

In the example illustrated in FIGS. 2-6, rotation of the joystick handle 52 is converted into movement of the FEL 12 (FIG. 1) in the following manner. Rotation of the joystick handle 52 about a first axis results in sliding movement of the core of the first push-pull cable 58, which adjusts the translational position of the spool 64 within the housing or sleeve of the first SCV 56 (FIG. 5). The first SCV 56 is fluidly coupled to the lift cylinders 34 of the FEL 12 (FIG. 1) by way of plumbing lines or conduits (only a small portion of which shown in FIG. 5 and identified by reference numeral "38"). The translational position of the spool 64 thus controls the flow of pressurized hydraulic fluid to the lift cylinders 34 in a manner setting the stroke position of the cylinders 34 and, therefore, the height of the boom assembly 22. In a similar manner, rotation of the joystick handle 52 about a second axis in sliding movement of the core of the second push-pull cable 62, which adjusts the translational position of the spool 66 within the housing of the second SCV 60. The second SCV 60 is fluidly coupled to the bucket cylinders 36 of the FEL 12 (FIG. 1) by fluid lines (again, only a small portion of which shown in FIG. 5 and identified by reference numeral "40"). The translational position of the spool 64 controls the flow of pressurized hydraulic fluid to the cylinders 36, which sets the stroke position of the bucket cylinders 36 and the tilt angle of the bucket 20.

As shown most clearly in FIG. 5, the joystick device 46 is located within the cabin interior 18 of the tractor 10 (FIG. 1), while the SCVs 56, 60 are external thereto. The SCVs 56, 60 may be positioned underneath the operator cabin 16 and, specifically, located at an elevation beneath the surface to which the adjustable seat 48 is mounted (referred to herein as the "seat mount surface" and identified in FIGS. 2-6 by reference numeral "68"). The seat mount surface 68 may be surface region of the floor of the operator cabin 16 in an embodiment. It is generally desirable to provide a relatively direct path for each of the push-pull cables 58, 62 to follow in extending from the joystick device 46 to the SCVs 56, 60, respectively. When transitioning from the cabin interior 18 to the exterior of the operator cabin 16, the push-pull cables 58, 62 each pass through an opening or port. The term "port," as appearing herein, refers to an opening through which at least one mechanical linkage, such as a push-pull cable, extends. The port or ports through which the push-pull cables 58, 62 extend may be sealed to help preserve the environmentally-sealed environment of cabin interior 18, as described more fully below.

Mechanical control system 44 further includes a linkage or cable routing box 70. The cable routing box 70 is installed within an opening 72 (identified in FIG. 5). Opening 72 is provided in the seat mount surface 68 at, for example, a location laterally adjacent the right hand side of the adjustable seat 48. The opening 72 may have an elongated planform geometry, such as an ovular or rectangular geometry, which is elongated as taken along the slide axis of the adjustable seat 48 (again, corresponding to the X-axis identified in FIG. 5 by coordinate legend 50). An upper portion of the cable routing box 70 may have a geometry substantially conformal with the elongated opening 72 such that, when installed within the operator cabin 16 of the tractor 10, the cable routing box 70 effectively plugs the opening 72. Stated differently, the cable routing box 70 covers or encloses the elongated opening 72, as viewed from the exterior of the operator cabin 16 and beneath the seat mount surface 68. The cable routing box 70 can be secured within the elongated opening 72 in various different manners including by welding. In the illustrated example, the cable routing box 70 includes an upper flange 74, which extends around the perimeter of box 70, which seats on the seat mount surface 68, and which is secured in place utilizing bolts 76 or other such fasteners.

The cable routing box 70 defines or encloses a lower compartment 78, which is located below the seat mount surface 68. As will be described more fully below, the lower compartment 78 effectively creates an additional volume of space for the provision of free length or "slack" with the push-pull cables 58, 62. In combination with the interior space of the operator cabin 16 located above the seat mount surface 68, this additional volume of space enables the provision of sufficient cable or free length to accommodate the ROM of the joystick device 46, while preventing or at least reducing the likelihood of the push-pull cables 58, 62 assuming a form or shape containing a tight bend exceeding RMIN. In this regard, the cable routing box 70 may have a maximum depth DBOX, as taken along a vertical axis (corresponding to the Y-axis identified by coordinate legend 50 in FIG. 5). Additionally, DBOX may be greater than or equal to at least one half the minimum tolerable bend radius of the push-pull cables 58, 62 (DBOX>½ RMIN). In other embodiments, DBOX may vary, as may the other dimensions, the construction, and the shape of the cable routing box 70.

As shown most clearly in FIG. 6, first and second ports 80, 82 are provided through a lower portion of the cable routing box 70. Specifically, the first and second ports 80, 82 are provided through a lower wall 84 of the cable routing box 70, which is referred to hereafter as "ported wall 84." The ports 80, 82 may each be environmentally sealed (e.g., utilizing epoxy, a grommet, or another seal member) to preserve the environmentally-sealed environment of the operator cabin 16, which, as noted above, may be temperature regulated by a non-illustrated HVAC system. Also, as shown exclusively in FIG. 6, at least one additional port 86 may be provided through the ported wall 84 to permit the passage of other linkages, a wire bundle, or the like. This may useful in embodiments wherein the joystick device 46 includes one or more electric devices (e.g., buttons, lights, rotary dials, etc.) from which signals are routed and/or to which power is provided via a wire or wire bundle 88. Again, a grommet or other seal member may be positioned around wire bundle 88 to seal the port 86 and help preserve the integrity of the sealed environment within the operator cabin 16. In further embodiments, the ports provided through the cable routing box 70 may be not be sealed.

Figure 3:
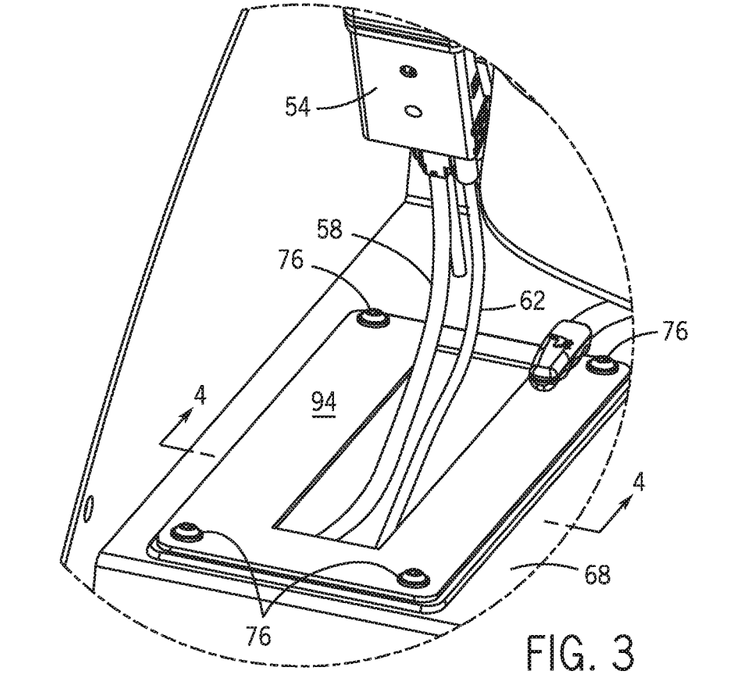
Figure 4:
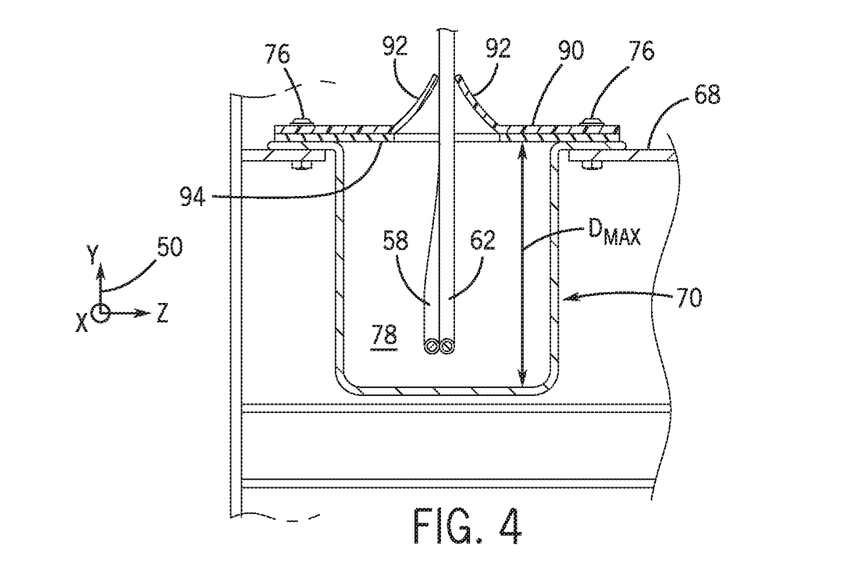
FIG. 4 is a partial cross-sectional view of the mechanical control system shown in FIGS. 2-3, as taken along line 4-4 identified in FIG. 2.

To prevent items from inadvertently dropping into the lower compartment 78 and to help further seal the interior of the operator cabin 16, a seal member 90 may be positioned over the elongated opening 72 provided in the seat mount surface 68. Seal member 90 can be molded into a floor matt of the work vehicle in an embodiment. As shown most clearly in FIG. 2, the seal member 90 can be a molded cover having a slit defined by flaps 92, which contact the push-pull cables 58, 62 as they emerge form the lower compartment 78. In further embodiments, the seal member 90 can assume other forms, such as that of a brush seal. As shown in FIG. 3 wherein the seal member 90 is hidden from view, a support plate 94 may further be disposed underneath the seal member 90 and the cable routing box 70 to provide additional structural support to the seal member 90 and to help further guide movement of the push-pull cables 58, 62. In the latter regard, the support plate 94 may include an elongated plate opening having planform dimensions less than the planform dimensions of elongated opening 72. In addition to extending through the flange 74 of the cable routing box 70, the bolts 76 may further extend through the seal member 90 and the support plate 94 to affix the assembly to the seat mount surface 68. Concurrently, the bolts 76 may be accessible from the interior of the operator cabin 16 to permit an operator to remove the seal member 90 and the support plate 94 and access the lower compartment 78, if needed.

The push-pull cables 58, 62 include intermediate portions that extend through the ports 80, 82, respectively, provided in the ported wall 84. The sheathings or outer tubing of the intermediate portions of the push-pull cables 58, 62 may be effectively affixed to the ports 80, 82. Similarly, the upper terminal ends of the push-pull cables 58, 62 may be affixed to the joystick device 46 at the locations at which the cables 58, 62 feed into the base portion 54. Thus, to accommodate the multi-DOF movement of the adjustable seat 48, the push-pull cables 58, 62 should be afforded sufficient free length or "slack" between these fixed attachment points. FIGS. 2-6 illustrate the adjustable seat 48 and the joystick device 46 is a neutral or centered position. The ROM of the adjustable seat 48 and, therefore, the ROM of the joystick device 46 is further illustrated in FIGS. 7A-7D wherein the neutral or centered position of the device 46 is indicated in phantom line. Specifically, FIGS. 7A-7D illustrate positional extremes of the adjustable seat 48 and joystick device 46 as taken along a vertical axis (the maximum height adjustment of the seat 48 shown in FIGS. 7B-7C, and the minimum height adjustment of the seat 48 shown in FIGS. 7A and 7D). Additionally, FIGS. 7A7D further illustrate positional extremes of the adjustable seat 48 and joystick device 46 as taken along the fore-aft or slide axis (the forward most position of the seat 48 shown in FIGS. 7A-7B, and the aft most position of the seat 48 shown in FIGS. 7C-7D).

To provide sufficient free length between the fixed attachment points of the push-pull cables 58, 62, while helping to ensuring that RMIN is not violated, each push-pull cable 58, 62 may be directed along a substantially C-shaped path when the adjustable seat 48 is in the entered position. In the illustrated example, this is accomplished, at least in part, by imparting the ported wall 84 with an angled disposition. The ported wall 84 is angled in the sense the wall 84 forms an angle $\theta_{PORT}$ with the respect a horizontal plane, such a horizontal plane along which the seat mount surface 68 extends. Angle $\theta_{PORT}$ may be acute in an embodiment and, perhaps, may be substantially equivalent to 45°. In other embodiments, the value of angle $\theta_{PORT}$ may differ from the aforementioned examples. Due to the angled disposition of the ported wall 84, the push-pull cables 58, 62 extend in substantially forward and downward directions when passing through the ported wall 84 of the cable routing box 70. Additionally, the push-pull cables extend in substantially aftward and downward directions when projecting from the lower end of the joystick device 46. As a result, the push-pull cables 58, 62 are generally guided along the C-shaped paths to provide adequate free length between the fixed attachment points of the cables 58, 62 accommodating movement of the adjustable seat 48 and the joystick device 46.

The geometry and disposition of the cable routing box 70 is further instrumental in allowing the joystick device 46 to move in conjunction with the adjustable seat 48 in the manner shown in FIGS. 7A-7D. As indicated above, the cable routing box 70 is located laterally adjacent adjustable seat 48. Furthermore, in the illustrated example, the cable routing box 70 may be positioned such that the routing box 70 and the joystick device 46 are transected by a vertical line orthogonal to a horizontal plane (e.g., a plane along which the seat mount surface 68 extends) in at least one position of the adjustable seat 48 and, perhaps, in the majority of the positions into which the seat 48 can be moved. Additionally or alternatively, the adjustable seat 48 may be movable along the first axis over a sliding ROM (generally shown in FIGS. 7A-7D, and at least a portion of the joystick device 46 may remain positioned over the cable routing box 70 for at least a majority of the sliding ROM of the adjustable seat 48. The foregoing examples notwithstanding, the cable routing box 70 may be imparted with varying different geometries and dispositions suitable for accommodating movement of the joystick device 46 (or other operator input device) in conjunction with movement of the adjustable seat 48. Additionally, the cable routing box 70 geometry may also be minimized to only enclose substantially that volume of space appropriate for accommodating the intermediate sections of push-pull cables 58, 62 to avoid interference with other components (e.g., hydraulic lines, drive train components, etc.) included within the tractor 10 and not shown in FIGS. 2-7D for clarity.

The foregoing has thus provided embodiments of a mechanical control system including at least one operator input device, such as a joystick device, which is well-suited for deployment onboard a tractor or other work vehicle. Advantageously, embodiments of the mechanical control system enable the operator input device to be readily positioned and repositioned over a relatively broad ROM within the operator environment of a work vehicle. The ability to position and reposition the operator input device enhances design flexibility and enables the operator input device to be optimally mounted to non-fixed structures within the work vehicle, such as an adjustable seat located within the operator cabin of a tractor or other work vehicle. The relative mobility of the operator input device may also help accommodate any other relative movement between the operator input device and the actuated device or devices as may occur due to, for example, the integration of a suspension system into the operator cabin or adjustable seat. The mechanical control system may consequently provide a more ergonomic, less cumbersome, and generally more positive experience for an operator of the work vehicle as he or she interacts with the operator input device.

While at least one example embodiment has been presented in the foregoing description, it should be appreciated that a vast number of variations exist. It should also be appreciated that the example embodiment or example embodiments are only examples, and are not intended to limit the scope, applicability, or configuration of the invention in any way. Rather, the foregoing description will provide those skilled in the art with a convenient road map for work implementing an example embodiment of the invention. It being understood that various changes may be made in the function and arrangement of elements described in an example embodiment without departing from the scope of the invention as set-forth in the appended claims.

What is claimed is:

1. A work vehicle, comprising:
   an operator cabin having an interior, an exterior, a seat mount surface, and an elongated opening that opens to the interior of the operator cabin;
   an adjustable seat within the interior of the operator cabin and supported by the seat mount surface, the adjustable seat slidable relative the seat mount surface along a first axis; and
   a mechanical control system, comprising:
      an operator input device mounted to the adjustable seat and moving therewith as the adjustable seat is slid along the first axis;
      a port beneath the seat mount surface spaced from the elongated opening; and
      a mechanical linkage extending from the operator input device, through the elongated opening and the port, and to the exterior of the operator cabin.

2. The work vehicle of claim 1, wherein the elongated opening is provided in the seat mount surface; and
   wherein mechanical linkage travels within the elongated opening as the seat is moved along the first axis.

3. The work vehicle of claim 1, wherein the mechanical linkage comprises a push-pull cable; and
   wherein the operator input device comprises a joystick device.

4. The work vehicle of claim 1, wherein the mechanical control system further comprises a linkage routing box mounted to the seat mount surface and extending downwardly therefrom, the linkage routing box having a wall through which the port is provided.

5. The work vehicle of claim 4, wherein the linkage routing box further comprises a box opening through which the mechanical linkage extends, the box opening at least in part defining the elongated opening.

6. The work vehicle of claim 5, further comprising a support plate overlying the box opening and having a plate opening through which the mechanical linkage extends, the plate opening having reduced planform dimensions relative to the box opening.

7. The work vehicle of claim 5, further comprising a seal member covering the box opening and contacting the mechanical linkage.

8. The work vehicle of claim 4, wherein the adjustable seat is movable along the first axis from a first positional extreme, through a centered position, and to a second positional extreme; and
   wherein the mechanical linkage comprises a push-pull cable following a substantially C-shaped path when the adjustable seat is in the centered position.

9. The work vehicle of claim 4, wherein the seat mount surface extends substantially along a horizontal plane, and wherein the ported wall forms an angle $\theta_{PORT}$ with the respect the horizontal plane.

10. The work vehicle of claim 9, wherein $\theta_{PORT}$ is acute.

11. The work vehicle of claim 4, wherein the seat mount surface extends substantially along a horizontal plane; and
    wherein the linkage routing box and at least a portion of the operator input device are transected by a vertical line orthogonal to the horizontal plane in at least one position of the adjustable seat.

12. The work vehicle of claim 4, wherein the seat mount surface extends substantially along a horizontal plane;
    wherein the linkage routing box has a maximum depth $D_{MAX}$, as taken along a vertical line orthogonal to the horizontal plane;
    wherein the mechanical linkage comprises a push-pull cable having a minimum tolerable bend radius of $R_{MIN}$; and
    wherein $D_{MAX} \geq 1/2\ R_{MIN}$.

13. The work vehicle of claim 4, wherein adjustable seat is movable along the first axis over a sliding range of motion, and wherein the operator input device remains positioned over the linkage routing box for at least a majority of the sliding range of motion of the adjustable seat.

14. The work vehicle of claim 1, further comprising a valve containing a valve element coupled to the operator input device by the mechanical linkage.

15. A work vehicle, comprising:
    an operator cabin;
    an actuated component located substantially beneath the operator cabin;
    an operator input device movably mounted within the operator cabin;
    a push-pull cable mechanically linking the operator input device to the actuated component such that movement of the operator input device actuates the actuated component; and
    a cable routing box defining a lower compartment located substantially beneath the seat mount surface, the push-pull cable extending from the operator input device, through the lower compartment, and to the actuated component.

16. The work vehicle of claim 15, further comprising:
    an adjustable seat located within the operator cabin;
    a seat mount surface to which the adjustable seat is mounted; and
    an opening provided in the seat mount surface, the cable routing box installed over the seat mount surface opening and extending downwardly therefrom.

17. The work vehicle of claim 15, further comprising a sealed port provided through a wall of the cable routing box, the push-pull cable having an intermediate segment extending through and fixed with respect to the sealed port.

18. The work vehicle of claim 17, wherein the push-pull cable extends (i) in a substantially aftward and downward direction when projecting from the operator input device, and (ii) in a substantially forward and downward direction when extending through the wall of the cable routing box.

19. A mechanical control system configured to be installed within a work vehicle including an adjustable seat and a cabin having an exterior, the adjustable seat supported by a seat mount surface of the operator cabin and movable relative thereto, the mechanical control system comprising:
    an operator input device configured to be mounted to the adjustable seat and to move therewith when the mechanical control system is installed within the work vehicle;
    a cable routing box configured to be mounted to the seat mount surface of the operator cabin and, when so mounted, defining a lower compartment located substantially beneath the seat mount surface; and
    a mechanical linkage extending from the operator input device, through the lower compartment, and to the exterior of the operator cabin when the mechanical control system is installed within the work vehicle.

20. The mechanical control system of claim 19, wherein the operator input device comprises a joystick device, and wherein the mechanical linkage comprises a push-pull cable.

* * * * *